United States Patent
Nam

(10) Patent No.: US 7,246,781 B2
(45) Date of Patent: Jul. 24, 2007

(54) SWIVEL STAND WITH SIDE SLOT AND SUCTION CUP BASE

(75) Inventor: Simon Sui Man Nam, Richmond Hill (CA)

(73) Assignee: Nanma Manufacturing Co., Ltd., Chai Wan (HK)

( * ) Notice: Subject to any disclaimer, the term of this patent is extended or adjusted under 35 U.S.C. 154(b) by 0 days.

(21) Appl. No.: 10/652,957

(22) Filed: Aug. 29, 2003

(65) Prior Publication Data

US 2005/0045779 A1    Mar. 3, 2005

(51) Int. Cl.
*F16M 13/00* (2006.01)

(52) U.S. Cl. ....................... 248/516; 248/519

(58) Field of Classification Search ................. 248/516, 248/518, 130, 521, 519, 131, 133; 601/123, 601/125, 128, 129, 131, 133
See application file for complete search history.

(56) References Cited

U.S. PATENT DOCUMENTS

| | | | |
|---|---|---|---|
| 431,036 A | 7/1890 | Dawson | |
| 538,534 A | 4/1895 | O'Neill | |
| 807,857 A | 12/1905 | Palmenberg | |
| 1,779,057 A | 10/1930 | Tolmach | |
| 2,439,009 A * | 4/1948 | Kujawski | 403/56 |
| 2,638,299 A | 5/1953 | Abbott | |
| 2,806,289 A * | 9/1957 | Rongaus et al. | 248/516 |
| 2,849,712 A * | 8/1958 | Klancnik, Jr. | 343/805 |
| 2,859,983 A | 11/1958 | May | |
| 2,861,501 A * | 11/1958 | Strelakos | 359/802 |
| 2,910,260 A | 10/1959 | Tanner | |
| 2,950,836 A | 8/1960 | Murdock | |
| 3,198,408 A * | 8/1965 | Benner | 223/66 |
| 3,776,649 A | 12/1973 | Kemezys | |
| 3,779,493 A * | 12/1973 | Gidlof | 47/40.5 |
| 3,783,547 A * | 1/1974 | Bystom et al. | 43/21.2 |
| 3,789,836 A | 2/1974 | Girten | |
| 3,947,139 A | 3/1976 | Feinbloom | |
| 4,066,231 A | 1/1978 | Bahner et al. | |
| 4,085,671 A * | 4/1978 | Gates et al. | 101/128.1 |
| 4,121,893 A | 10/1978 | Morissette | |
| 4,571,882 A * | 2/1986 | Capen | 47/40.5 |
| 4,988,065 A | 1/1991 | Leban et al. | |
| 5,088,852 A | 2/1992 | Davister | |
| 5,094,415 A * | 3/1992 | Revette et al. | 248/133 |
| 5,280,871 A | 1/1994 | Chuang | |
| 5,466,078 A | 11/1995 | Szmanda et al. | |
| 5,492,301 A * | 2/1996 | Hauser | 248/516 |
| 5,513,784 A | 5/1996 | Pretorius | |
| 5,737,847 A * | 4/1998 | Britton | 34/97 |
| 5,769,369 A | 6/1998 | Meinel | |
| 5,792,081 A * | 8/1998 | Cross | 601/123 |
| 6,328,270 B1 | 12/2001 | Elberbaum | |
| 2002/0114660 A1 | 8/2002 | Burton | |
| 2002/0190167 A1 | 12/2002 | Rodriguez | |

\* cited by examiner

*Primary Examiner*—A. Joseph Wujciak, III
(74) *Attorney, Agent, or Firm*—Peter S. Gilster; Greensfelder, Hemker & Gale, P.C.

(57) ABSTRACT

A stand for supporting a vibrator/massaging device provides a swiveling and pivoting relationship through a ball joint connection between the massaging device and the base stand. The base stand comprises a suction cup bottom which enables attachment to a variety of flat surfaces. The stand has a receptacle for receiving a shaft end of the massaging device in a snug fit, and has a slot in its side wall for receiving an electrical cord for the massaging device.

10 Claims, 3 Drawing Sheets

SWIVEL STAND WITH SIDE SLOT AND SUCTION CUP BASE

BACKGROUND OF THE INVENTION

The invention relates to devices for holding and retaining massagers and vibrators for permitting hands free self-manipulation by a user. In today's society, instant gratification is a much sought-after goal. People are continually striving to devise more creative activities for deriving pleasure. The sexual device industry is fast becoming a significant market force, and the styles and varieties of sexual aids is limited only by the imagination. Vibrators and other phallic-shaped implements are a mainstay of many feminine private collections. Needless to say, for effective operation, the user must grasp the device with her hand and manually manipulate it as required. On occasion, however, it may be inconvenient or impractical to use one's hand, especially if the user has her hands engaged with a partner or is engaged in some other activity. While it may be possible to affix the vibrator or massager to a surface, the result may be dissatisfying if the rigid placement of the device does not allow for reciprocal movement with the user, and may even cause pain. It is therefore desirable to provide a capability for mounting a vibrator or massager so that it provides relative movement with respect to the point of mounting so the user may enjoy hands free manipulation.

Vibrators occasionally have power cords which can be a hindrance when mounting the device. Structures with receptacles for receiving the shaft of a vibrator normally work quite well for those that are battery operated and are cordless. For those vibrating devices which have a cord emanating from their base shaft end, however, a receptacle mounting means poses a problem. The extra space occupied by the cord prevents a snug fit, which is necessary for retention of the vibrator. While a open-bottomed receptacle might permit the cord to be guided through, it presents an inconvenience to the user in having to thread the cord through the open bottom end. A person seeking instant gratification is not likely to have the patience required to surgically guide the cord through that opening.

It would further be desirable if the means for mounting the vibrator permitted quick and easy attachment to a variety of surfaces. It would be even further desirable if the means for mounting the vibrator permitted quick and easy attachment in a variety of orientations. It would be yet further desirable if the means for mounting the vibrator was able to accommodate a power cord emanating from the vibrator and still retain the vibrator in a snug, secure mounted relationship.

SUMMARY OF THE INVENTION

The present invention is directed to a swivel stand device that is sized and shaped to receive a vibrating/massaging device and that allows for improved manipulation of the device without requiring use of a user's hands. The swivel stand comprises a shaft receiving receptacle pivotally mounted on to a base member through a ball and joint attachment. The receptacle is adapted for receiving and retaining the base of a vibrating/massaging device. The shaft receiving receptacle has a longitudinal slot in its side that receives the vibrator's electrical cord or the like for connecting the device to a battery or control box without interfering with the proper seating of the device's base within the receptacle. The side slot provides a convenient way to retain the cord so that it does not interfere with the snug fit of the vibrating/massaging device in the receptacle. It further provides for slight expansion of the receptacle walls to permit slightly larger diameter devices to be received in the receptacle.

The swivel stand is mounted to a suction cup base which permits attachment to a wide variety of surfaces. In operation, the swivel stand device may be temporarily attached by applying the suction cup base to a flat surface, such as a tile floor or a smooth wall. The user then inserts the base of the vibrating/massaging device into the receptacle of the swivel stand. Once so inserted, the user threads the electrical cord of the vibrating/massaging device through the side slot in the receptacle. The user then may freely rotate and swivel the stand relative to the flat surface by virtue of the ball and socket joint connection between the stand and the suction cup base.

It is therefore an object of the invention to provide a stand for a vibrating/massaging device that can be attached to a wide variety of surfaces. It is a further object of the invention to provide a stand that enables the vibrating/massaging device to be manipulated into a wide variety of orientations and positions with respect to the surface engaged by the base. It is still further an object of the invention to provide a stand for a vibrating/massaging device that can accommodate an electrical or power cord disposed at the bottom of the device.

These and other objects of the present invention are realized in the preferred embodiment of the present invention, described by way of example and not by way of limitation. Additional objects, advantages and novel features of the invention will be set forth in the description that follows, and will become apparent to those skilled in the art upon examination of the following more detailed description and drawings in which like elements of the invention are similarly numbered throughout.

BRIEF DESCRIPTION OF THE DRAWINGS

FIG. 6 is an exploded, perspective view of the components of the embodiment of the device shown in FIG. 5.

DETAILED DESCRIPTION OF THE INVENTION

Figure 2:
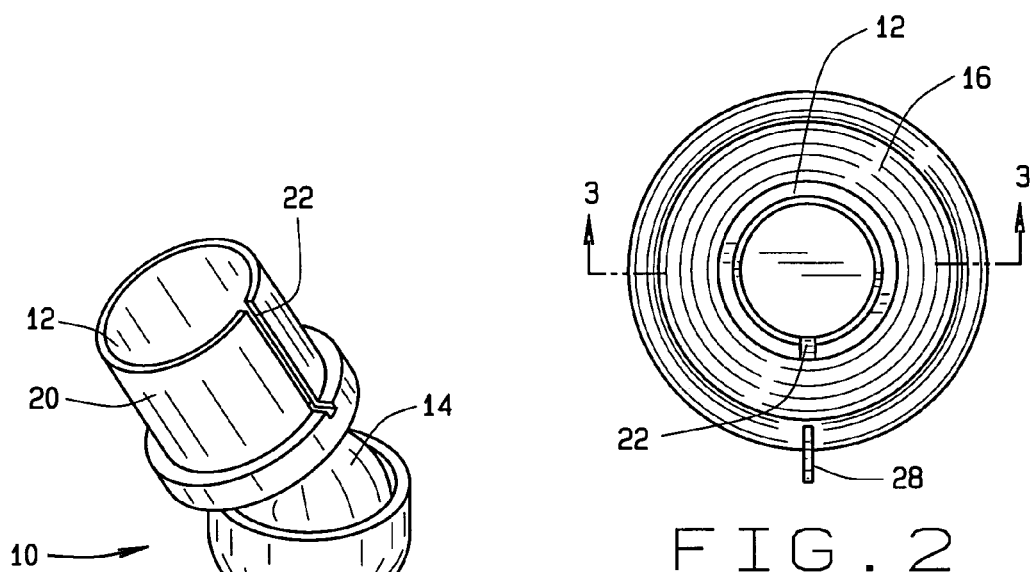
FIG. 2 is a top plan view of the device.
Figure 1:
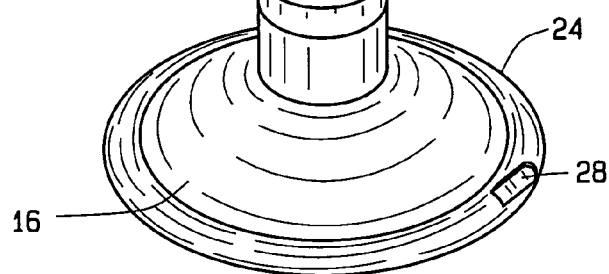
FIG. 1 is a perspective view of a preferred embodiment of the present invention.
Figure 3:
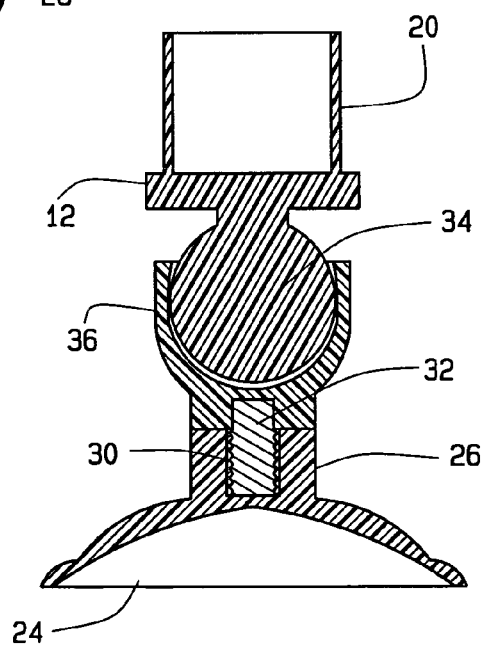
FIG. 3 is a cross-sectional view in side elevation taken along lines 3-3 of FIG. 2.
Figure 4:
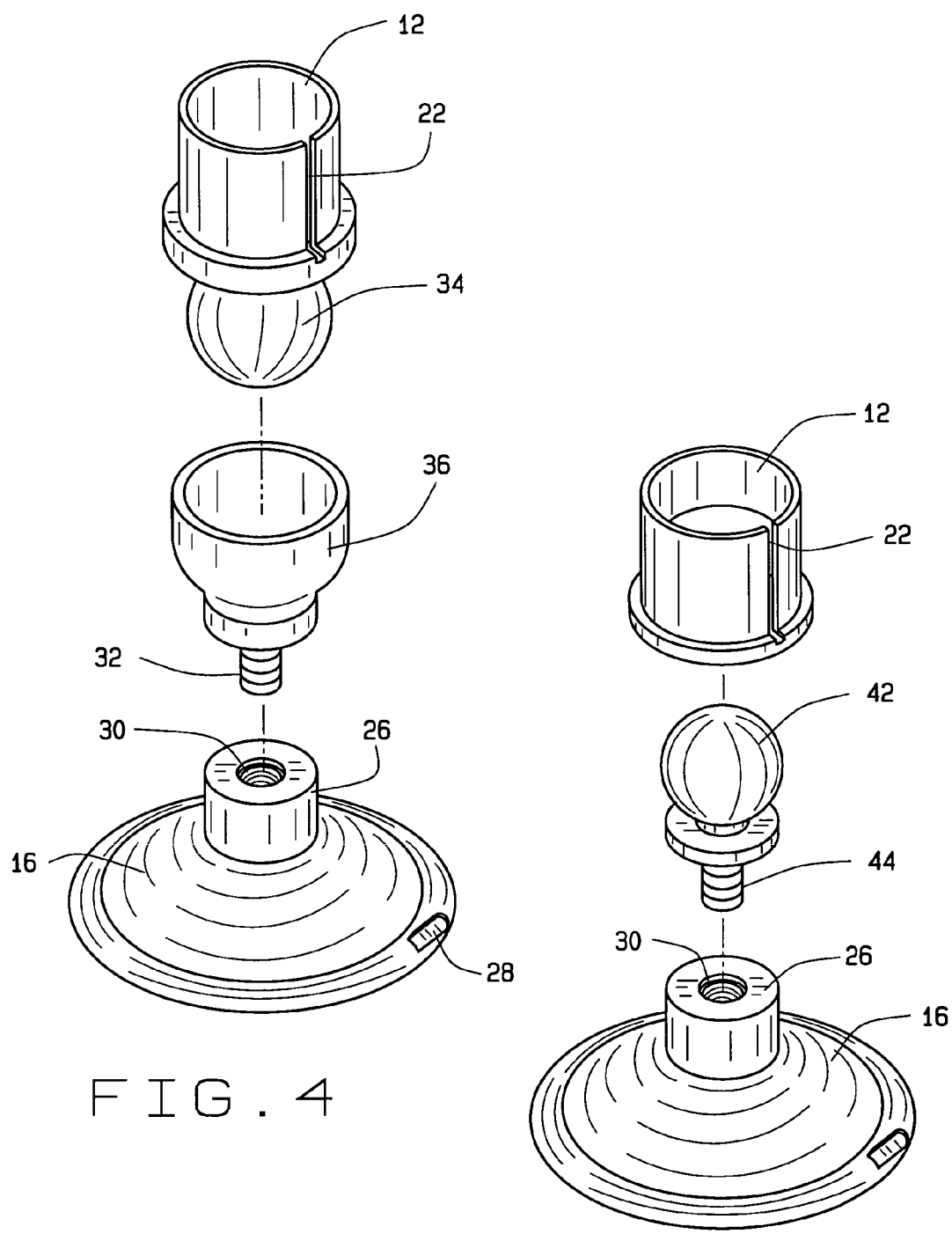
FIG. 4 is an exploded, perspective view of the components of the device.
Figure 5:
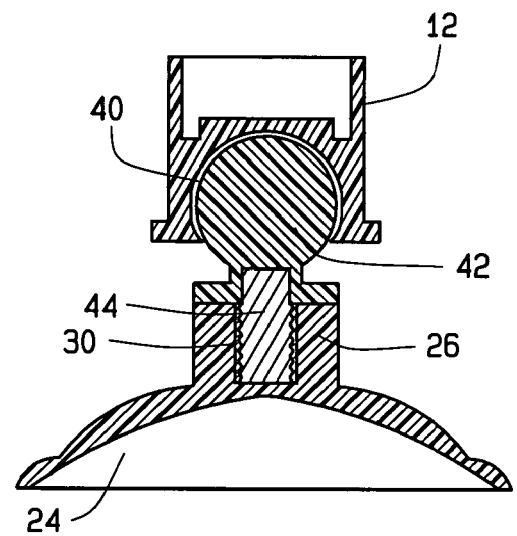
FIG. 5 is a cross-sectional view in side elevation of another embodiment of the present invention similar to that of FIG. 3.
Figure 7:
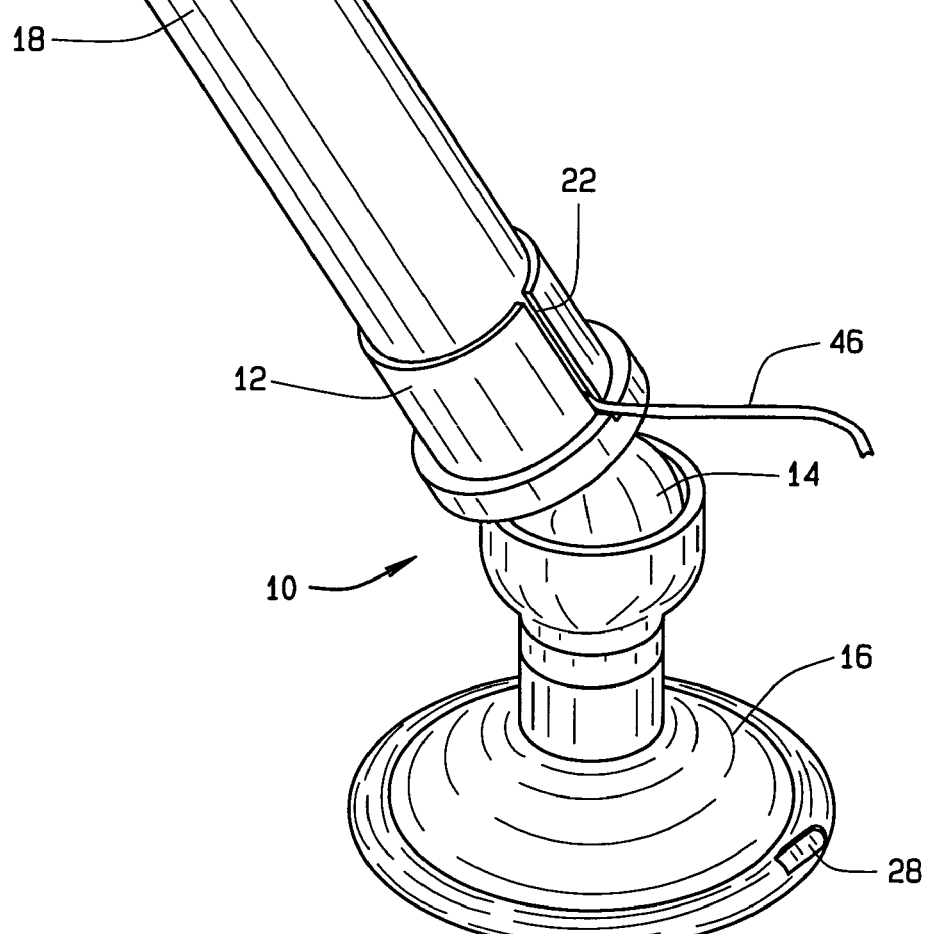
FIG. 7 is a perspective view of the device supporting a massaging device.

Referring to the drawings, a preferred embodiment of the swivel stand of the present invention is illustrated and generally indicated as 10 in FIGS. 1-7. The stand is comprised of receiving receptacle 12, ball joint member 14, and base member 16. Receiving receptacle 12 is hollow chamber and having rim extending outwardly at the bottom and is adapted to receive the shaft base end of a vibrating/massaging device 18 as seen in FIG. 7. To permit expansion of side walls 20, receiving receptacle is preferably comprised of plastic. Expansion of the side walls will allow a massaging device with a slightly larger diameter to be held in the receiving receptacle in a snug fit. A side slot 22 is disposed in receiving receptacle 12, and extends from a top lip thereof for a substantial distance down the side of receptacle 12 as shown in FIG. 1. Side slot 22 also permits expansion of side walls 20 to receive a massaging device with a slightly larger diameter to be held in the receiving receptacle in a snug fit.

Base 16 comprises a suction cup attachment face 24 and socket body 26. Suction cup face 24 permits attachment to a wide variety of flat surfaces, and can even be placed on a wall. A lifting tab 28 is provided on a perimeter edge of suction cup 24 to permit easy release of suction built up between the base and an engaged surface so that the device may be removed from the surface. Socket body 26 is supported on top of suction cup 24 and can be integrally formed therewith by molding or may be glued on or the like. Socket body 26 forms an internal threaded socket 30 which receives a threaded stud 32 that serves to connect ball joint 14 with base 16.

Ball joint 14 permits a swiveling and pivoting relationship between massaging device receiving receptacle 12 and base 16. One preferred embodiment is shown 3 and 4, and provide for a ball member 34 integrally attached to the bottom of receiving receptacle 12. Ball member 34 is dimensioned to fit in cup member 36 to establish a swiveling and pivoting relationship therebetween. Cup member 36 is provided with threaded stud 32 for attachment to threaded socket 30 of base 16.

Another preferred embodiment is shown 5 and 6, and provides for a cup member 40 internally disposed in the bottom of receiving receptacle 12. Ball member 42 has a threaded stud 44 which permits engagement with threaded socket 30 of base 16.

In operation as seen in FIG. 7, the swivel stand device 10 may be temporarily attached by applying suction cup 24 of base 16 to a flat surface, such as a tile floor or a smooth wall. The user then inserts the base of the vibrating/massaging device 18 into the receiving receptacle 12. Once so inserted, the user threads the electrical cord 46 of the vibrating/massaging device 18 through threaded slot 22. The user then may freely swivel stand 10 relative to the flat surface by virtue of the ball and socket relationship between receiving receptacle 12 and base 16.

It should be understood from the foregoing that, while particular embodiments of the invention have been illustrated and described, various modifications can be made thereto, as will be apparent to those skilled in the art, without departing from the spirit and scope of the invention. Such changes and modifications are within the scope and teaching of this invention as defined in the claims appended hereto

What is claimed is:

1. A stand for supporting a shaft-ended object in a swiveling and rotating relationship, said stand comprising:
    a shaft receiving receptacle,
    a ball joint member, and
    a base member, said base member being adapted to be connected to a support surface, said shaft receiving receptacle being supported on said base member through said ball joint member in a swiveling and rotating relationship, said receptacle being adapted to receive a shaft end of said object, whereby said object may be supported for pivotable and rotational movement with respect to said stand, said shaft receiving receptacle defining a hollow chamber and rim extending outwardly at bottom, said chamber having a longitudinal slot disposed in a side wall thereof, said longitudinal slot originating at a top edge at an open end of said chamber and extending a substantial distance along a length of said chamber and terminated edge of rim.

2. The stand of claim 1 in which said base member comprises a suction cup.

3. The stand of claim 1 in which said receptacle and ball joint member are comprised of plastic.

4. The stand of claim 3 in which said shaft receiving receptacle has an expansive resilience to receive a shaft of an object having a larger diameter than said hollow chamber for a snug fit.

5. The stand of claim 3 in which said ball joint member comprises a ball member pivotally received in a cup member connected to said base member, said cup member having an expansive resilience, said ball member being thereby removable from said cup member.

6. A stand for supporting a vibrating/massaging device in a swiveling and rotating relationship, said stand comprising:
    a shaft receiving receptacle,
    a ball joint member, and
    a base member, said base member comprising a suction cup and being adapted to be connected to a support surface, said shaft receiving receptacle being directly supported on said base member through said ball joint member in a swiveling and rotating relationship, said shaft receiving receptacle being adapted to receive a shaft end of said vibrating/massaging device, whereby said vibrating/massaging device may be supported for pivotable and rotational movement with respect to said stand, said shaft receiving receptacle and ball joint member being comprised of plastic, said shaft receiving receptacle having an expansive resilience to receive said shaft of said vibrating/massaging device having a larger diameter than said hollow chamber for a snug fit wherein said shaft receiving receptacle defines a hollow chamber, said chamber having a longitudinal slot disposed in a side wall thereof, said longitudinal slot originating at a top edge at an open end of said chamber and extending a substantial distance along a length of said chamber.

7. A stand for supporting a shaft-ended object in a swiveling and rotating relationship, said stand comprising:
    a shaft receiving receptacle,
    a ball joint member, and
    a base member, said base member comprising a suction cup and being adapted to be connected to a support surface, said shaft receiving receptacle being supported on said base member through said ball joint member in a swiveling and rotating relationship, said receptacle being adapted to receive a shaft end of said object, whereby said object may be supported for pivotable and rotational movement with respect to said stand, said shaft receiving receptacle defining a hollow chamber, said chamber having a longitudinal slot disposed in a side wall thereof, said longitudinal slot originating at a top edge at an open end of said chamber and extending a substantial distance along a length of said chamber.

8. The stand of claim 7 in which said receptacle and ball joint member are comprised of plastic.

9. The stand of claim 8 in which said shaft receiving receptacle has an expansive resilience to receive a shaft of an object having a larger diameter than said hollow chamber.

10. The stand of claim 8 in which said ball joint member comprises a ball member pivotally received in a cup member connected to said base member, said cup member having an expansive resilience, whereby said ball member is removable from said cup member.

* * * * *

UNITED STATES PATENT AND TRADEMARK OFFICE
CERTIFICATE OF CORRECTION

PATENT NO. : 7,246,781 B2 Page 1 of 1
APPLICATION NO. : 10/652957
DATED : July 24, 2007
INVENTOR(S) : Simon Siu Man Nan It is certified that error appears in the above-identified patent and that said Letters Patent is hereby corrected as shown below:

On Title page Item [75]
Inventor's name "Sui" and "Nam" are incorrectly spelled and should be --Siu-- and --Nan--.

Signed and Sealed this

Sixth Day of November, 2007

JON W. DUDAS
*Director of the United States Patent and Trademark Office*